Patented Dec. 27, 1932

1,892,528

UNITED STATES PATENT OFFICE

JOHN ALLEN HEANY, OF NEW HAVEN, CONNECTICUT, ASSIGNOR TO SIRIAN LAMP COMPANY, OF NEWARK, NEW JERSEY, A CORPORATION OF DELAWARE

CATHODE COATING COMPOSITION AND METHOD OF MAKING THE SAME

No Drawing. Application filed September 7, 1928. Serial No. 304,609.

The present invention relates to a composition of matter and method of making the same, and more particularly to a composition of matter particularly adapted for the coating of the cathodes of vacuum tubes or thermionic tubes, the coating being subsequently treated so as to be adapted to emit electrons when sufficiently heated; and to a method of making the said composition which may be readily applied to cathodes and treated in a manner to produce a homogeneous electron-emitting composition.

A considerable difficulty has heretofore been experienced in connection with the manufacture of thermionic tubes or vacuum tubes because of the difficulty of obtaining a composition which will adhere to the cathode surface during manufacture without alteration or deterioration, and which when treated to produce the final electron-emitting composition will not flake or jar off during transportation or handling of the tubes. The effect of such flaking or detaching of portions of the electron-emitting or emissive material is to cause short circuits when the tube is subsequently used, thus rendering the tube inefficient or wholly inoperative. Furthermore, the problem of obtaining an electron-emitting material in a suitably pure state so as not to contain occluded gases which would be evolved or emitted during use of the tube has not heretofore been wholly solved because of the fact that exposure of the materials heretofore used to the atmosphere during the manufacture of the thermionic tubes resulted in a chemical change or modification in the cathode coating composition, apparently through absorption of gases or becoming altered in some manner through absorption of water vapor that gases are gradually given off during the use of the tube so as to decrease the vacuum to an extent to seriously diminish electronic emission, rendering the tubes inefficient or useless after a relatively short period of use.

The coating composition which I have discovered possesses unique properties which are particularly adapted to be applied to cathodes without danger of flaking or jarring off during the process of manufacture of the tube and without producing alteration in its composition during the time that the coating material is exposed to the atmosphere during manufacturing operations. The coating composition is moreover particularly adapted to provide a closely adhering compact electron-emitting coating by the method of heat treatment to remove the organic binding material and other volatile constituents of the cathode coating composition and to produce an electron-emitting composition which does not retain or occlude residual gases to be subsequently given off during use of the tube.

One object of this invention is to provide a material which may be readily applied to the cathode surface of the thermionic tubes or other element surface of electronic devices during manufacture thereof to produce a uniform and substantially homogeneous surface, and which when treated in the prescribed manner, hereinafter set forth will not melt or otherwise change its physical state until heat treatment at the high temperature to decompose the organic material and to remove undesired constituents in the composition.

Another object of the invention is to provide a method of coating the cathode of thermionic tubes so that the cathodes may be handled during process of manufacture without deterioration of the coating and which will provide a homogeneous electron-emitting surface of uniform distribution serving to furnish a suitable flow of electrons at a relatively low temperature.

Another object of the invention is to provide a method of making the coating composition of my invention so that the material may be applied and fixed to the cathode in a manner to be permanently attached thereto during the manufacturing operations until the subsequent heat treatment by which its composition is altered to produce the final electron-emissive coating, and which after such alteration remains tightly adherent to the cathode surface so as not to flake or jar off during handling or transportation.

Another object of the invention is to provide a method of making my coating composition and of incorporating it into electronic devices by which the elements which are to serve as the electron-emitting materials in the ultimate coating composition in the electronic device may be incorporated or combined therein in a uniform and intimate manner at a relatively low cost and with a saving of time over the methods heretofore used.

Another object of the invention is to provide a novel cathode coating composition adapted to be transformed to the ultimate electron-emitting materials in a manner to avoid exposure to the atmosphere during manufacturing operations so as not to become altered or effected in a manner to give off residual gases after the electronic device has been manufactured and the desired vacuum has been formed.

With these and other objects in view, the invention comprises various features hereinafter more fully described and more particularly defined in the claims.

In order to provide a cathode coating composition having the desired properties above referred to, the elements which are to serve as the electron-emitting coating in the ultimate composition are preferably introduced into the cathode coating composition either in the form in which they are to be finally present in the electron-emissive coating or in a form adapted to be converted into the final form by heat or combined heat and reduced pressure under conditions readily provided in manufacturing steps for making vacuum tubes or electronic devices, and the materials are moreover, introduced in the most stable form which may be converted, in order to avoid as far as possible the introduction of moisture and other undesired constituents into the composition. The elements or ingredients of the composition are admixed and united by the use of a novel form of binder having properties which specifically adapt it to the desired use, the binder employed being preferably a soap composition of a form which when decomposed will supply ingredients desired in the ultimate electron-emitting coating of the thermionic tube.

In the preferred embodiment of my invention, I employ a mixture of barium and strontium compounds of a form which will be substantially unaltered when exposed to air during the compounding of the coating composition, and I mix therewith a soap binder derived from china wood or tung oil, alkaline earth soap binders which will provide or assist in electronic emission in the ultimate coating being preferably employed. The tungates of barium and strontium are best suited for carrying out the invention for the reason that these soaps on decomposition under the conditions of manufacture hereinafter described yield barium and strontium oxides, or in other words, the materials desired for electronic emission in the final product, but it is to be understood that other tungates may be employed or a single tungate might be used if desired. Lithium tungate might, for example, be used alone as a binder or with other alkaline earth tungate soaps to serve as a binding medium in my cathode coating composition.

The general method of carrying out my invention comprises first forming a china wood oil soap of an alkaline earth metal or metals, and then mixing the soap product in proper proportions with other materials which when treated in the manner hereinafter set forth will provide the desired composition in the ultimate electron-emitting coating. The cathode coating composition may be applied to the cathode by the use of any suitable vehicle, although turpentine is preferably employed for the purpose. It is to be understood, however, that kerosene or other suitable volatile thinner may be employed if desired for the purpose. After the cathode coating material has been applied to the cathode by means of a brush, for example, the cathode is gradually heated to set the coating and is then mounted in the electronic device in which a high vacuum is produced to drive off, volatilize or decompose organic material and other undesired constituents of the coating; the tubes or electronic devices are then sealed while the vacuum is maintained, in a manned well known to those skilled in the art.

In the manufacture of the cathode coating composition it is highly important that the soap to be employed therein be not exposed for a substantial amount of time, or to any substantial extent, to light or actinic rays until the ingredients of the coating composition have been thoroughly mixed and turpentine has been added as a vehicle for the mixing operation. During the mixing operation, however, which for best results requires about 48 hours, the ingredients must be subjected to the action of light or actinic rays, exposure of the composition to light being made for a sufficient length of time to bring about the desired effect or change in the material although the material is preferably exposed during the entire time of mixing.

The exact modification or change which is brought about by exposure to light is not known, although it appears probable that the change is one of polymerization by which the material is modified in its properties through which it is rendered suitable for the desired end. It is to be understood that without the exposure to light in the manner described, or in an equivalent way to bring about the desired change, the resultant coating composition becomes unsuited to produce a satisfactory electron-emitting coating.

The preferred method of carrying out the process of my invention may be described more in detail as follows: I preferably dissolve caustic soda (sodium hydroxide) in water in the proportion of about thirteen ounces of the caustic soda to about a quart of cold water and allow the mixture to stand until the caustic soda has been dissolved, the temperature of the solution rising during solution to about 130° F. due to the heat of the solution. The solution is then preferably allowed to cool to about 98° Fahrenheit before proceeding with the making of a tungate soap. The solution may obviously be stirred or agitated while the caustic soda is being dissolved and during the cooling operation to obtain a uniform solution or to assist in the cooling of the solution.

To the caustic soda solution as prepared above is then added a suitable amount of china wood oil (tung oil) preferably in the proportion of about six pounds of the tung oil to a quart of the caustic soda solution, the oil being preferably gradually added or poured into the caustic soda solution with continued stirring, whereby saponification of the oil proceeds uniformly with the production of sodium tungate. As soon as the mixture commences to solidify, or at the stage at which it is about the consistency of honey, the soap product is preferably poured into a mold and allowed to stand for about three days, during which time the saponification reaction progresses until it is substantially complete. The material is then preferably removed from the mold and cut into small blocks or units for exposure to the atmosphere at ordinary room temperature for about two days more, the material being then ready for use for admixture with other ingredients to produce the cathode coating composition. If desired, the material thus prepared may be stored in a refrigerator maintained at a low temperature for a period of six months or more, whereas if the material were allowed to remain in the atmosphere at ordinary room temperature for more than two weeks after the completion of the saponification reaction the material undergoes a change in which a brownish liquid exudes to the surface of the soap mass and is rendered unsuitable for use in making the cathode coating composition of my invention.

It should be noted at this point that if the sodium tungate soap is allowed to stand for a considerable time exposed to light, a decomposition or deleterious modification takes place rendering the soap unsuitable for use in my composition. It is found, however, that by avoiding exposure to light and to temperatures above ordinary room temperature for any substantial time after the material has been made, as may be done by storing or preserving the material in a refrigerator, the sodium tungate soap remains substantially unchanged for periods as long as six months, and may then be suitably used for the preparation of the alkaline earth soaps in the manner hereinafter described.

In order to form an alkaline earth tungate soap from the caustic soda soap, prepared in the manner above described, a soluble salt of the alkaline earth metal is preferably used, being added in the form of a water solution to a water solution of the sodium tungate soap.

In the making of a barium tungate soap, for example, from the china wood oil soda soap, the latter is dissolved in a suitable amount of water and a water solution of barium chloride is then added, being preferably made by dissolving about five ounces of barium chloride in a quart of water, this solution being gradually added with constant stirring to the water solution of the china wood oil soap maintained at a suitable temperature. The china wood oil soda soap solution is preferably formed by dissolving about thirteen ounces of the soap in about twelve quarts of water heated to not above 98° F. in order to avoid decomposition of the sodium tungate soap. The sodium tungate soap is preferably filtered before the addition of the barium chloride solution so as to obtain a clear solution free from impurities or undissolved soap particles.

The barium chloride solution is preferably added slowly to the soda soap solution and with constant stirring in order to obtain a uniform product as a result of the metathesis reaction in which a milky white precipitate of barium tungate is formed together with sodium chloride which remains dissolved in the solution.

In connection with the formation of the barium tungate soap, it is of extreme importance in removing the precipitate by filtration that it be not washed to any substantial extent, for the reason that washing apparently results in a modification or change in the barium tungate soap rendering it unsuited for the formation of the cathode coating composition of my invention, for the reason that the ultimate electron emitting coating formed therefrom would be of low efficiency and relatively unsatisfactory. It has been found, however, that the soap material obtained by filtering off the precipitate without washing yields a wholly satisfactory electron-emitting coating.

I am not prepared to state the reasons why the washing of the precipitate with water yields unsatisfactory results, but it is apparent that some reaction or effect takes place which changes the character and properties of the final electron-emitting product. It is possible that a small amount of sodium chloride is retained in the final product by omitting the washing of the tungate precipitate and that this material assists in the emission of electrons from the strontium and barium oxides. Whatever theory may account for the observed effects, it is apparent that the best results may be obtained by avoiding washing the precipitate tungate material with water.

In the filtration of the barium tungate from the solution in which it is precipitated, it is preferable to filter the mass until the precipitate is in a condition resembling the consistency of tooth paste; the material may then be spread on drying pans in the usual manner and dried at a temperature of about 104° Fahrenheit, the drying generally taking place in about thirteen to fifteen hours.

In order to form the strontium tungate, I preferably dissolve about six ounces of strontium nitrate in a quart of water and separately dissolve about thirteen ounces of sodium tungate soap in about thirteen quarts of water. These two solutions are then mixed by pouring the strontium nitrate solution gradually into the sodium tungate soap solution heated not substantially above 98° Fahrenheit which results in a precipitation of strontium tungate and the formation of sodium nitrate in the solution, the latter remaining dissolved in the water solution. The precipitate may be treated in the same manner as that described with reference to barium tungate, care being exercised to avoid exposure of the barium tungate to the action of light or to temperatures substantially above room temperature after its formation. If the barium and strontium tungates are not used at once in the formation of the cathode coating composition after drying at about 104° Fahrenheit as above stated, for thirteen to fifteen hours, it is preferable to preserve them in a refrigerator unexposed to light at substantially freezing temperature.

After the tungate soap or soaps have been prepared as above described, these materials are combined with other elements and serve to form the binding medium for the cathode coating composition. I preferably from the coating composition by mixing about 16 grams of barium dioxide with about the same weight of strontium hydroxide and add thereto about 4 grams of barium tungate, and the same weight of strontium tungate, the materials being preferably mixed in a mortar to obtain a preliminary uniform mixing. To this mixture is then added about 63 c. c. of turpentine to serve as a vehicle for applying the coating composition, the mixture being then put into a suitable grinding mill or ball mill having a casing or covering of a material such as glass which will permit passage of actinic rays. In small scale production of the coating composition, glass jars made of soda glass may be satisfactorily used and a means to assist in the grinding, such as ⅜″ steel balls may be inserted therein, producing a grinding action similar to that of a ball mill. The grinding operation generally requires about 48 hours, and during this time the mill is preferably exposed to daylight or the action of light from electric bulbs to provide actinic rays which apparently bring about the desired modification or change in the tungate material.

After the grinding operation is completed, the material may then be kept in a refrigerator at a low temperature without deterioration for a period of at least six months.

In order to apply the coating composition to a cathode or other surface, a suitable brush is preferably used to obtain a uniform coating of suitable thickness. After the composition has been applied, the cathodes are preferably baked at a temperature of from 200° to 265° C., to remove the vehicle and other volatile material and to obtain a uniform hard adhering coating. The baking operation is preferably carried on for about 2 hours, the temperature being gradually raised during the operation to the upper limit. The coated cathode is then mounted on a stem in the usual manner for the making of thermionic tubes, and is then sealed in place with the other elements of the thermionic tube by the use of a sealing-in machine. A hood is then placed over the thermionic tube which has been connected to a vacuum pump, the temperature of the tube being gradually raised by external heat supplied from the hood to assist in securing a high vacuum, after which the temperature of the cathode and other elements inside the tube is increased to a bright red heat by means of the internal filament and application of plate current. At this temperature the tungate is decomposed with the evolution of gases, which are drawn off by means of the vacuum pump. As the temperature is increased the barium dioxide is decomposed with the formation of barium oxide and the liberation of oxygen. It is apparent that as a result of the decomposition of the tungate material a small amount of carbon is precipitated which discolors the coating to some extent. As the temperature is increased, however, the greyish color disappears which is due apparently to the oxidation of the carbon, which takes place, in my opinion, through the liberation of oxygen from the barium dioxide at the increased temperature and reduced pressure, the oxygen being liberated in sufficient amounts over the surface of the coating material to cause substantially complete oxidation of the free carbon present. During this operation there is apparently no opportunity for the combined oxides to take up foreign gases which would subsequently be gradually given off during the operation of the thermionic tube and the final electron emission coating thus made has proved entirely satisfactory.

The use of barium dioxide is preferable to barium oxide not only for the reason that it takes part in the reaction to remove separated carbon in the composition, but also for the reason that barium oxide is more hygroscopic than barium dioxide and takes up considerable amounts of moisture on exposure to air. Barium dioxide is unreactive with carbon dioxide, whereas moist barium oxide would react with carbon dioxide present in the air. With the use of barium dioxide, therefore, there is less tendency for the introduction of undesired elements or impurities into the coating composition. Strontium hydroxide on the other hand, is substantially unaffected by water vapor or moisture in the air and may, therefore, be employed directly in combination with the other ingredients of the cathode coating composition.

It is probable that in the heating operation during the decomposition of the cathode coating composition carbonates are formed to some extent due to the presence of carbon dioxide liberated in the decomposition of the tungates, but if they are formed they are apparently decomposed at the temperature to which they are subjected under the reduced pressure going over to the oxides, so that in the final composition only the oxides of barium and strontium are present as far as can be determined.

In place of barium and sodium tungates as a binding material in my coating composition, I may employ other tungates, such as lithium tungate for example, although I have found that the tungates of barium and strontium are most suitable for my purpose. It is to be understood therefore, that I do not desire to be limited to the specific form of the invention as described, but that various changes and modifications may be made in the process and product above described without departing from the spirit or scope of the invention as defined in the claims annexed hereto.

Having thus described my invention, what I claim as new is:

1. A cathode coating composition comprising an oxide of an alkaline earth metal and a tungate soap binder.

2. A cathode coating composition comprising an alkaline earth compound yielding under reduced pressure and high temperature a corresponding electron-emissive alkaline earth substance, in admixture with an alkaline earth tungate soap binder yielding on decomposition an electron-emissive substance, and a volatile vehicle.

3. A cathode coating composition comprising non-hygroscopic compounds of alkaline earth metals yielding on exposure to heat and reduced pressure corresponding electron-emissive oxides, in admixture with an alkaline earth tungate.

4. A cathode coating composition comprising non-hygroscopic alkaline earth metal compounds yielding on exposure to heat under reduced pressure the corresponding electron-emissive oxides, said compounds being in admixture with a sufficient amount of an alkaline earth tungate to serve as a binder, the said tungate being of such composition as to yield on reduction a desired constituent of the electron-emissive coating to be formed, and an amount of volatile vehicle sufficient for applying the cathode coating composition.

5. A cathode coating composition comprising barium peroxide, another stable non-hygroscopic compound adapted to yield on exposure to heat under reduced pressure an electron-emissive substance, and a tungate soap binder in admixture therewith, adapted to yield on exposure to a decomposing temperature a desired constituent of the electron-emissive substance, and a volatile vehicle for applying the mixture.

6. A cathode coating composition which comprises barium dioxide, strontium hydroxide and an alkaline earth tungate in a sufficient quantity to serve as a binding medium, together with a neutral volatile vehicle adapted to permit uniformly applying the coating composition to a surface.

7. A cathode coating composition comprising substantially equal weights of barium dioxide and strontium hydroxide together with one-fourth of the weight of barium and strontium tungates and a relatively small amount of a volatile vehicle.

8. A cathode coating composition which comprises an electron-emissive alkaline earth metal compound together with the tungate of an alkaline earth metal which when reduced provides an electron-emissive constituent.

9. A method of forming an electron-emitting coating which comprises mixing a tungate soap with a compound stable in the atmosphere which under heat will yield the desire electron-emitting substance, decomposing the said soap at an elevated temperature and transforming the said compound by means of heat into the said electron-emitting substance.

10. A method of forming an electron-emitting coating which comprises mixing a tungate soap with a compound stable in the atmosphere which under heat will yield the desired electron-emitting substance, decomposing the said soap at an elevated temperature, transforming the said compound by means of heat into the said electron-emitting substance, and drawing off the gases and volatile substances under reduced pressure from the said coating during decomposition of the said soap and said compound.

11. A method of forming an electron-emitting oxide coating which comprises mixing a high melting point tungate soap serving as a binder with a compound which under treatment at a high temperature will form an electron-emitting oxide, subjecting the mixture to a high temperature to decompose the said soap and to form said oxide, and drawing off under reduced pressure the gases evolved from the mixture.

12. A method of forming an electron-emitting oxide coating which comprises mixing a high melting point tungate soap with an electron-emitting oxide and a compound adapted to form an electron-emitting oxide on exposure to high temperatures, subjecting the material to a temperature sufficient to decompose the said soap and to form the oxide from the said compound, and drawing off the evolved gases under reduced pressure during the heat treatment to form the desired electron-emitting oxide coating.

13. A method of making a cathode coating composition which comprises admixing a tungate soap as a binder with an alkaline earth compound adapted to provide an electron-emissive coating and subjecting the admixture to the action of light for a suitable time to acquire the properties to adapt it for forming a cathode electron-emissive coating.

14. A method of making an electron-emissive cathode coating which comprises forming an alkaline earth metal tungate soap without prolonged exposure to light, admixing the said soap with an alkaline earth metal compound to serve as a binder for applying the compound as a coating, subjecting the admixture to the action of light for a suitable time to acquire the desired properties, and subjecting the said admixture to a high temperature under reduced pressure to produce the desired electron-emissive coating.

15. A method of making an electron-emissive coating which comprises forming an alkaline earth metal tungate soap capable of forming an adherent coating without prolonged exposure to light, admixing said soap as a binder with a non-hygroscopic mixture of alkaline earth metal compounds which on exposure to high temperature under reduced pressure form the corresponding oxides of the said alkaline earth metals, adding a volatile vehicle to the admixture, grinding the said admixture during prolonged exposure to light to obtain a uniformly treated admixture, coating a cathode surface with the resulting mixture, subjecting the said mixture to a high temperature under reduced pressure to decompose the said soap and to form the said corresponding oxides.

16. A method of forming an electron-emitting oxide coating which comprises mixing a high melting point alkaline earth soap with an alkaline earth oxide and an oxidizing agent adapted to yield oxygen when subjected to a high temperature, applying the material to the surface upon which the electron-emitting substance is to be formed, gradually raising the temperature under reduced pressure to decompose the said soap and to cause evolution of oxygen from the said oxidizing compound to oxidize carbon separated through decomposition of the said soap, drawing off the evolved gases from the heated material and finally forming a high vacuum to prevent access of moisture or air to said electron-emitting coating.

17. A method of forming an electron-emitting oxide coating which comprises mixing a tungate soap of an alkaline earth metal with an alkaline earth oxide and a peroxide of an alkaline earth metal adapted to yield oxygen at an elevated temperature to form the lower oxide, applying the mixture to a cathode surface, gradually heating the said material under reduced pressure to decompose the said soap and to cause evolution of oxygen from the said peroxide to oxidize separated carbon in the coating, drawing off evolved gases during the heating process, increasing the vacuum to that desired and sealing the device to prevent access of foreign gases.

18. A method of forming an electron-emitting oxide coating which comprises mixing strontium hydroxide, barium peroxide, an alkaline earth tungate soap and a vehicle; coating the electronic element upon which the electron-emitting oxide coating is to be formed with the resulting mixture; applying heat to the said coating and raising the temperature under reduced pressure to decompose the said tungate soap and to cause evolution of oxygen from the barium peroxide to oxidize carbon separated through the decomposition of the said soap; thereafter forming a high vacuum and sealing the casing of the electronic device to maintain the said vacuum after the electron-emitting coating has been formed.

19. A method of forming an electron-emitting oxide coating which comprises mixing strontium hydroxide, barium peroxide, strontium tungate soap and barium tungate soap in the proportion of about one part of soap to four parts of other material, adding turpentine thereto to serve as a vehicle for applying the resulting mixture, applying a coating of suitable thickness to the cathode of an electronic device, drying the said coating at a temperature between 200 and 265° C., inserting the said coated cathode in an electronic device and heating the cathode under reduced pressure to decompose the tungate soap and to cause evolution of oxygen from the barium peroxide to oxidize carbon separated through the decomposition of the said soap, drawing off the evolved gases and increasing the vacuum in the electronic device to the amount required and finally sealing the electronic device to prevent access of atmospheric air or foreign substances thereto.

20. A method of forming a cathode coating which comprises mixing a compound of an electron emissive alkaline earth metal with a tungate soap binder, exposing said mixture to the action of light, forming a coating of said mixture and decomposing said alkaline earth metal substances at high temperature under reduced pressure.

21. A method of making a cathode coating which comprises mixing electron emissive alkaline earth substances with an alkaline earth tungate soap binder and with a volatile vehicle, coating a cathode with said mixture and decomposing said electron emissive alkaline earth substances at a high temperature under reduced pressure.

22. A method of forming a coating composition which comprises mixing an electron emissive alkaline earth metal substance with a tungate soap binder and exposing said mixture to the action of light.

In testimony whereof, I affix my signature.

JOHN ALLEN HEANY.